Aug. 31, 1965    W. A. HARTING, JR    3,203,710
MUD FLAP RETRACTOR
Filed April 24, 1964    2 Sheets-Sheet 1
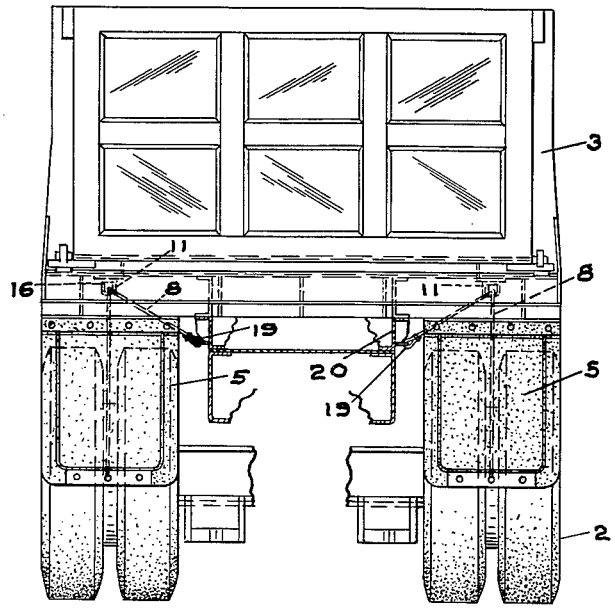
FIG. 1.
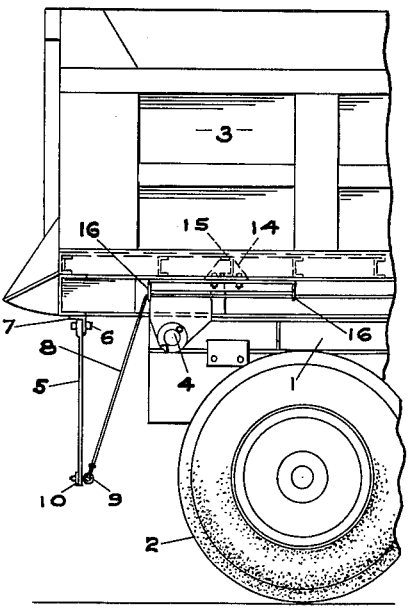
FIG. 2.
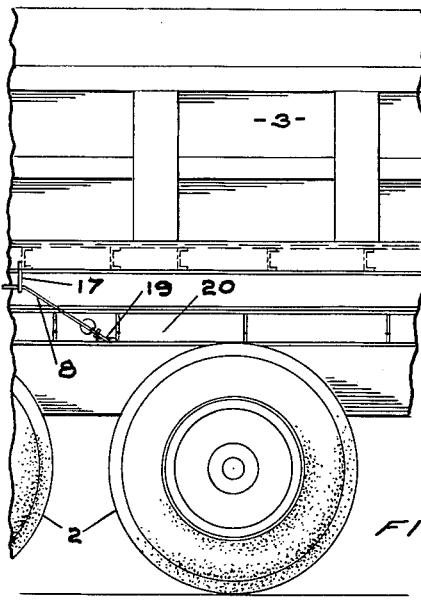
FIG. 5.
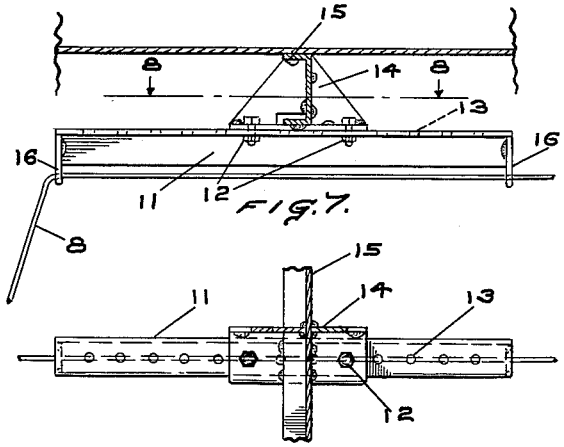
FIG. 7.
FIG. 8.
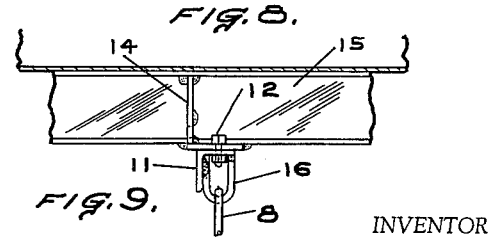
FIG. 9.
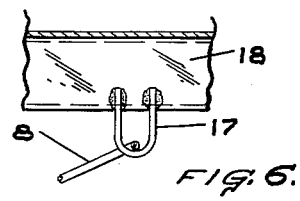
FIG. 6.
INVENTOR
William A. Harting, Jr.
BY Thomas W. J. Clark
ATTORNEY

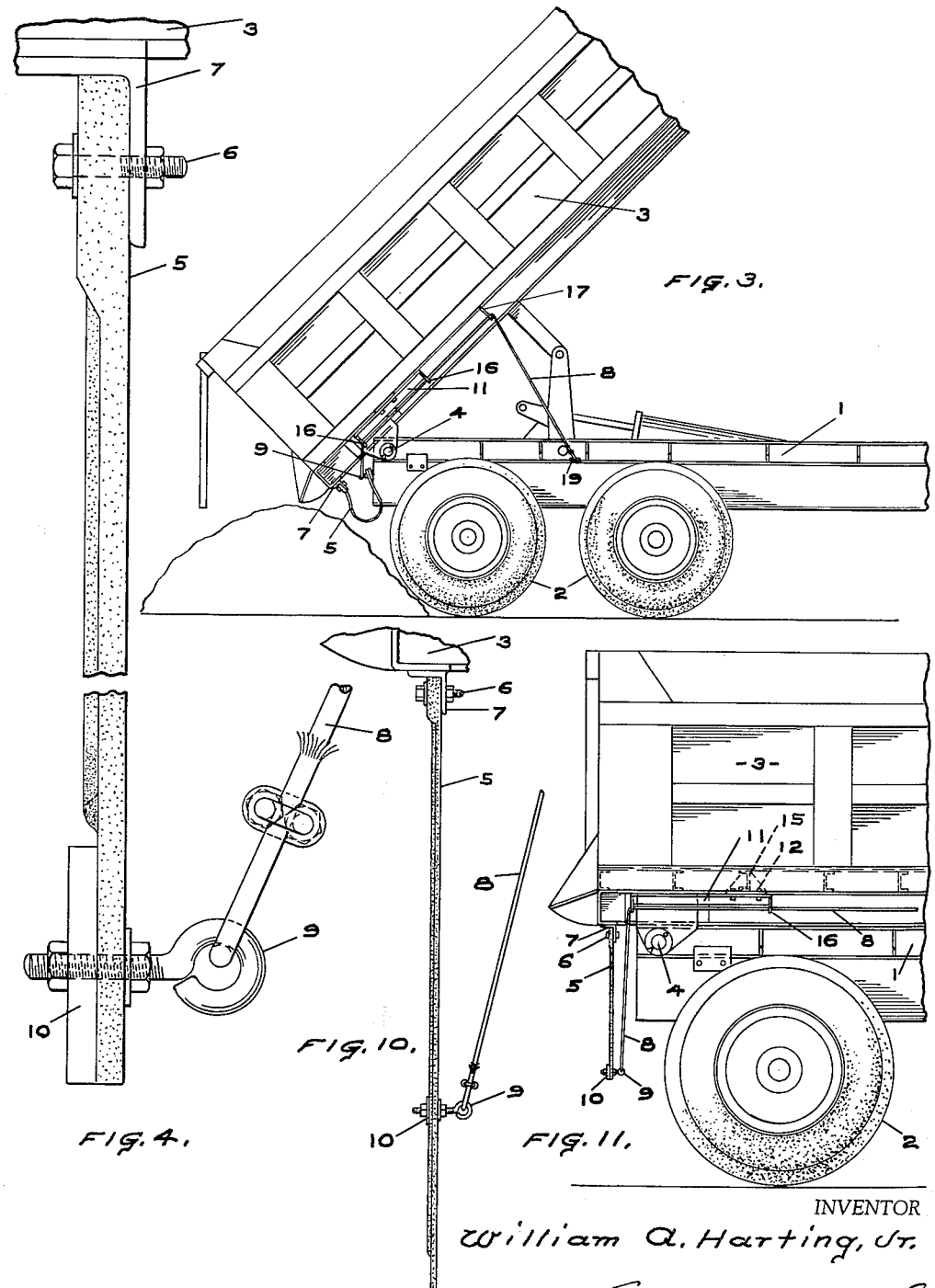

3,203,710
MUD FLAP RETRACTOR
William A. Harting, Jr., Baltimore, Md.
(2930 Hammonds Ferry Road, Lansdowne 27, Md.)
Filed Apr. 24, 1964, Ser. No. 362,405
2 Claims. (Cl. 280—154.5)

This invention relates to a retractor for a splash guard or mud flap frequently placed to the rear of the rear wheels of a truck to prevent the wheels from throwing up mud and gravel in the path of oncoming vehicles.

The laws of many states are now making the use of splash guards obligatory. It has been found that when they project downwardly back of the rear wheels and when the truck is tilted to discharge its load that the guard is often lowered and thereby pushed by the pile of the discharged material against the rear wheels or it is embedded in the pile of discharged material so as to break the guard or tear it. It is an object of the present invention to bend the splash guard transversely from its vertically hanging position, upon the elevation of the truck, so as to withdraw the lower end of the guard from possible contact with the wheels of the vehicle or the discharged load. Many devices have been made to withdraw the whole guard or flap or to turn it sidewise or in some other manner to remove it from its position of danger upon the elevation of the truck. These devices have often required additional operating means and they have been quite complex and so expensive that they have very rarely been used. Also the additional operating means are too often forgotten by the truck driver. One of the principal objects of the present invention is to make the guard retractor so simple, not only in installation, but in operation, that it will operate automatically and will become standard equipment on every truck which has splash guards thereon.

Another object of the invention is to construct a guard retractor that may be adapted for use on various trucks, that is trucks project different distances from the rear wheels or have their frame and body beams in different locations.

Other objects and advantages of the invention will be apparent from the following description and the accompanying drawings forming a part hereof and in which:

FIGURE 1 is a rear elevational view of a truck equipped with the instant invention.

FIGURE 2 is a side elevational view of the rear of the truck equipped with the invention.

FIGURE 3 is a side elevational view of the elevated body of a truck showing the action of this invention in use.

FIGURE 4 is a detailed side elevational view partly broken away, of the splash guard showing the attachment to the rear of the truck and its lower end elevating cable.

FIGURE 5 is a fragmentary elevational view of the truck showing the attachment of the cable to the truck frame, continuing FIGURE 4 forward.

FIGURE 6 is a slightly enlarged fragmentary view of a cable guide showing its attachment to the body of the truck.

FIGURE 7 is a fragmentary view partly in section, showing the adjustable bracket for the cable guides.

FIGURE 8 is a horizontal sectional view on line 8—8 of FIGURE 7.

FIGURE 9 is an end elevational view of the bracket and guides of FIGURE 7.

FIGURE 10 is a side elevational view of a splash guard which extends closer to the ground than that of the preceding figures and in which the elevating cable is attached to the guard at a distance from its lower end.

FIGURE 11 is a side elevational view of the rear of a truck showing an alternate spacing of the guide bracket in relation to its position of attachment on the truck body.

In the drawings similar numerals refer to similar parts throughout the several views.

The lift or dump truck has a frame 1 and rear wheels 2 on each side and a body 3 which is pivoted as at 4 on the frame 1 and to the rear of the pivot the body projects outwardly from the rear wheels of the truck, as best shown in FIGURES 2 and 3.

The splash guards 5 each extend across one of the double wheels 2 so that as those wheels rotate in transit the mud and gravel which they pick up will be thrown against the guard and deflected down rather than into the air where an aproaching vehicle could be struck and damaged. The guard is preferably bolted at the top as by bolts 6 to an angle iron 7 on the lower rear end of the truck body 3. The guard 5 is flexible and may be bent up upon itself as shown in FIGURE 3 by means of the cable 8 attached to an eye bolt 9 bolted adjacent the lower end of the guard, as shown at 10.

A bracket 11 is bolted at 12 through spaced holes 13 in the bracket, the heads of the bolts 12 are held in brackets 14 welded to cross beams 15 of the body. The brackets 11 have guides 16 welded thereto at each end and through these guides cable 8 passes, and it then continues through front guide 17 further forward on the truck body which is welded to a cross beam 18 as shown in FIGURE 6. The forward end of the cable is then directed inwardly toward the truck center where it is held by loop 19 welded to longitudinal beams 20 of the truck frame.

Should it be desired to extend the splash guard closer to the ground as shown in FIGURE 10, it is preferable to space the eye bolt 9 from the lower end of the guard as shown in this figure, so that the amount of pull or movement of the cable 8 remains substantially the same and would, in a similar manner, elevate the guard from the reach of the material that may be dumped as well as keep it from the truck wheels.

In FIGURE 11 the bracket 11 is shown in a rearwardly extending adjusted position to prevent the flap from contacting the wheels 2 when it is pulled up. This is quite desirable where the truck body has its pivot 4 closer to the rear end of the truck as shown in this figure.

It will be apparent that a very simple guard or flap elevating mechanism is provided and which is activated automatically by the elevation of the body, the forward end of the cable being fixed to the frame, and the cable slides through the guides upon the tilting of the body, lifting the lower end of the guard or flap and drawing it up to fold it transversely so that it is removed from the pile of dumped material and from the rear wheels of the truck so that the life of the guard is greatly increased.

It will be apparent that many modifications may be made in the construction illustrated without departing from the invention as defined in the following claims.

What is claimed as new and is desired to be secured by Letters Patent is:

1. In a wheeled road vehicle having a frame including longitudinally extending frame beams, and an overhanging elevating body tiltably mounted on the frame near to the rear end including cross beams, a vertically hanging flexible splash guard fixedly hung by its upper edge from the back of the body rearwardly of the rear wheel, a bracket having spaced openings therethrough adjustably secured to one of said cross beams and having cable guides at its opposite ends, a further cable guide on said body forwardly of said bracket, and a cable connected to the lower end of said splash guard extending through all of said cable guides with means connecting the forward end of said cable to a frame beam to fold up the splash guard upon the elevation of said body.

2. The subject matter as claimed in claim 1, said vehicle having dual wheels at its rear, dual splash guards for said dual wheels, and a pair of brackets, one for each pair of dual wheels, and said brackets being adjustable forwardly and rearwardly to compensate for the length of the splash guards and for varying distances between the splash guards and the pairs of dual wheels.

References Cited by the Examiner
UNITED STATES PATENTS

| | | | |
|---|---|---|---|
| 2,721,760 | 10/55 | Lapham | 280—154.5 X |
| 2,981,553 | 4/61 | Zerbe | 280—154.4 |

BENJAMIN HERSH, *Primary Examiner.*

LEO FRIAGLIA, *Examiner.*